(12) United States Patent
Matsuno et al.

(10) Patent No.: US 6,568,295 B2
(45) Date of Patent: May 27, 2003

(54) TRANSMISSION CONTROL APPARATUS FOR AN AUTOMOBILE

(75) Inventors: Takanori Matsuno, Hamana-gun (JP); Shigeaki Oda, Hamana-gun (JP); Shigeki Nomura, Wako (JP); Takashi Sugiyama, Wako (JP); Yoshinori Furusawa, Wako (JP); Hiroshi Hanjono, Wako (JP)

(73) Assignees: Kabushiki Kaisha Atsumitec, Shizuoka-ken (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/908,281

(22) Filed: Jul. 18, 2001

(65) Prior Publication Data

US 2002/0020242 A1 Feb. 21, 2002

(30) Foreign Application Priority Data

Jul. 18, 2000 (JP) ........................................ 2000-217150

(51) Int. Cl.[7] .............................................. B60K 20/00
(52) U.S. Cl. .................................. 74/473.3; 74/473.36
(58) Field of Search .......................... 74/473.3, 473.36, 74/523, 524, 491

(56) References Cited

U.S. PATENT DOCUMENTS 6,286,385 B1 * 9/2001 Nishimura et al. ...... 74/473.33

FOREIGN PATENT DOCUMENTS

| JP | 09-58288 | * | 3/1997 |
| JP | 10-067245 | | 3/1998 |
| JP | 10-129290 | | 5/1998 |
| JP | 10-138778 | | 5/1998 |
| JP | 11-278085 | | 10/1999 |

* cited by examiner

Primary Examiner—William C Joyce
(74) Attorney, Agent, or Firm—Harness, Dickey & Pierce, P.L.C.

(57) ABSTRACT

A transmission control apparatus for an automobile to be arranged on or near an instrument panel of a vehicle comprising: a bracket for supporting a control lever unit for speed-change operation; a plate secured to the bracket; a shaft passed through both the bracket and the plate for rotatably supporting the control lever unit therearound; a first shock absorbing portion adapted to be broken when a shock load exceeding a predetermined value is applied to the control lever unit in order to absorb the shock load and to release the support of the shaft from the bracket or the plate; and a second shock absorbing portion adapted to be deformed by the shaft released from the bracket and displaced together with the control lever unit over a predetermined stroke in order to continuously absorb the shock load.

18 Claims, 6 Drawing Sheets

TRANSMISSION CONTROL APPARATUS FOR AN AUTOMOBILE

BACKGROUND OF THE INVENTION

1. Field of the Invention

The present invention relates to a transmission control apparatus for an automobile arranged at or near an instrument panel, and more particularly to a transmission control apparatus allowing absorption of the shock load when the shock load is applied to a control lever of the apparatus.

2. Description of Background Art

In usual, a transmission control apparatus having a shift lever of a manually operated transmission or a selector lever of an automatic transmission (the shift lever and the selector lever will be hereinafter referred to "control lever") is arranged at a center console between a driver's seat and a assistant driver's seat. However, it has been proposed to arrange the transmission control apparatus at or near an instrument panel of a vehicle in view of ensuring a wide space on the front floor of vehicle and improving the operability of the transmission control apparatus.

Arrangement of the transmission control apparatus at or near the instrument panel makes it possible to assure a wide space near the front seats and thus to prevent erroneous touch of a driver with the control lever. In addition, since the control lever is positioned adjacent to a steering wheel, it is possible for a driver to quickly move his hand gripping the steering wheel to the control lever.

For example, Japanese Laid-open Patent Publication No. 67245/1998 discloses a technology for absorbing the shock load applied to the control lever of the transmission control apparatus arranged at or near the instrument panel. This technology intends to absorb the shock load with a pivot portion formed on the base end of the control lever being broken when the shock load is applied to the control lever.

Other technologies for absorbing the shock load with the supporting member of the control lever being broken are disclosed in Japanese Laid-open Patent Publication Nos. 129290/1998, 138778/1998 and 278085/1999.

However all of these prior arts intend to absorb shock load only through the breakage of the supporting member of the control lever. Accordingly, although it is possible to absorb the primary shock load, the secondary shock load would be often caused after the control lever having become free.

Japanese Laid-open Patent Publication No. 278085/1999 discloses a transmission control apparatus in which provided are a plurality of means for absorbing shock load through the breakage of the supporting member of the control lever. The shock load is absorbed by this type of shock absorbing means in a discontinuous manner and thus smooth shock absorption cannot be achieved by these shock absorbing means. In addition, since all the shock absorbing steps are performed through the breakage of the supporting member of the control lever, the characteristics of the shock absorption of each shock absorbing means is identical and thus the degree of freedom in setting the shock absorbing characteristics is reduced.

In these prior arts, there is a disclosure of providing a gas layer within a gripping knob for absorbing the shock load. However the gas layer does not act as a cushion when an exceeding shock load is instantaneouly applied to the control knob and thus only the shock absorption through the breakage of the supporting member of the control lever can be achieved, which causes a same problem as that mentioned above.

In addition, it may be conceivable that a supporting member of whole the transmission control apparatus can be broken in order to absorb the shock load when the shock load is applied to the control lever. However this is undesirable in view of reducing a space for the transmission control apparatus since whole the transmission control apparatus including the control lever is displaced in this case and thus it is required to previously keep the space therefor.

SUMMARY OF THE INVENTION

It is, therefore, an object of the present invention to provide a transmission control apparatus for an automobile which can improve the space reduction and the degree of freedom in setting the shock absorbing characteristics as well as can smoothly absorb the secondary shock load following the absorption of the primary shock load.

The object of the present invention can be achieved according to the present invention of claim 1 by providing a transmission control apparatus for an automobile to be arranged on or near an instrument panel of a vehicle comprising a bracket for supporting a control lever unit for speed-change operation; a plate secured to the bracket; a shaft passed through both the bracket and the plate for rotatably supporting the control lever unit therearound; a first shock absorbing portion adapted to be broken when a shock load exceeding a predetermined value is applied to the control lever unit in order to absorb the shock load and to release the support of the shaft from the bracket or the plate; and a second shock absorbing portion adapted to be deformed by the shaft released from the bracket and displaced together with the control lever unit over a predetermined stroke in order to continuously absorb the shock load.

According to the structure of claim 1, the applied shock load is firstly absorbed by the breakage of the first shock absorbing portion and secondly continuously absorbed by the deformation of the second shock absorbing portion. It is preferable to provide the first shock absorbing portion on either one of the bracket or the plate and the second shock absorbing portion on the other one of the bracket or the plate.

In the present invention of claim 2, the first shock absorbing portion may comprise a supporting portion forming an aperture through which the shaft is passed; the second shock absorbing portion may comprise a deformable portion formed by a portion through which the shaft can pass and a slot extending along the displacement direction of the shaft and having a width smaller than the outer diameter of the shaft; and the supporting portion and the slot may be formed either in the bracket or in the plate respectively.

According to the structure of claim 2, the primary shock load is firstly absorbed by the breakage of the supporting portion and then the second shock load is continuously absorbed by the deformation of the slots.

In the present invention of claim 3, the supporting portion may be formed in the bracket, and the deformable portion may be formed in the plate.

According to the structure of claim 3, the primary shock load is firstly absorbed by the breakage of the supporting portion formed in the bracket and then the second shock load is continuously absorbed by the deformation of the deformable portion formed in the two plate.

In the present invention of claim 4, a second slot or a notch (recessed portion) may be additionally formed near the slot with extending substantially parallel with the slot.

According to the structure of claim 4, the material forming the second shock absorbing portion may be deformed toward the second slot or the notch.

In the present invention of claim 6, the bracket may be formed by molding, and the first shock absorbing portion (or portions) may be integrally formed with the bracket.

In the present invention of claim 10, the plate may be made of metal having a predetermined ductility.

BRIEF DESCRIPTION OF THE DRAWINGS

Preferred embodiments of the present invention will be described with reference to the accompanied drawings in which.

DESCRIPTION OF THE PREFERRED EMBODIMENTS

Figure 1:
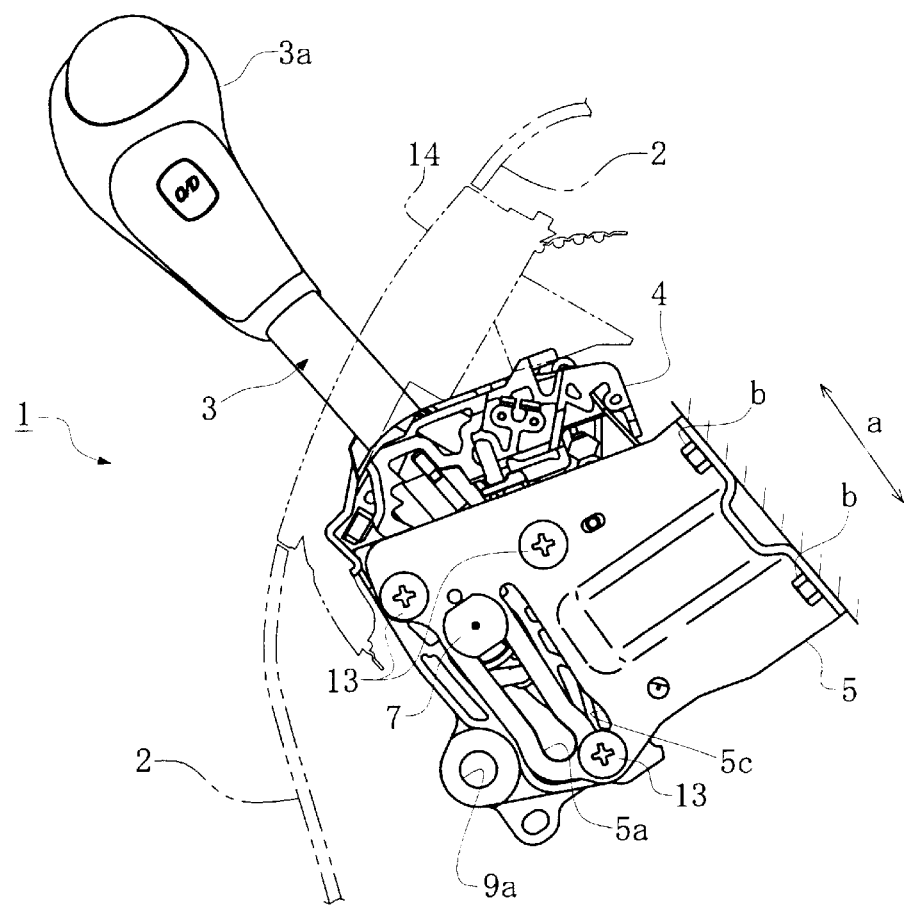
FIG. 1 is a side elevational view of a transmission control apparatus for an automobile in accordance with a preferred embodiment of the present invention.

A transmission control apparatus for an automobile 1 shown as a preferred embodiment of the present invention in drawings is an automatic transmission and comprises mainly a bracket 4 to be mounted in a region of an instrument panel 2 for supporting a control lever (selector lever) unit 3; plates 5 and 6; a supporting shaft 7; a supporting portion 8 as a first shock absorbing portion; and slots 5a and 6a forming a second shock absorbing portion as shown in FIG. 1.

Figure 3:
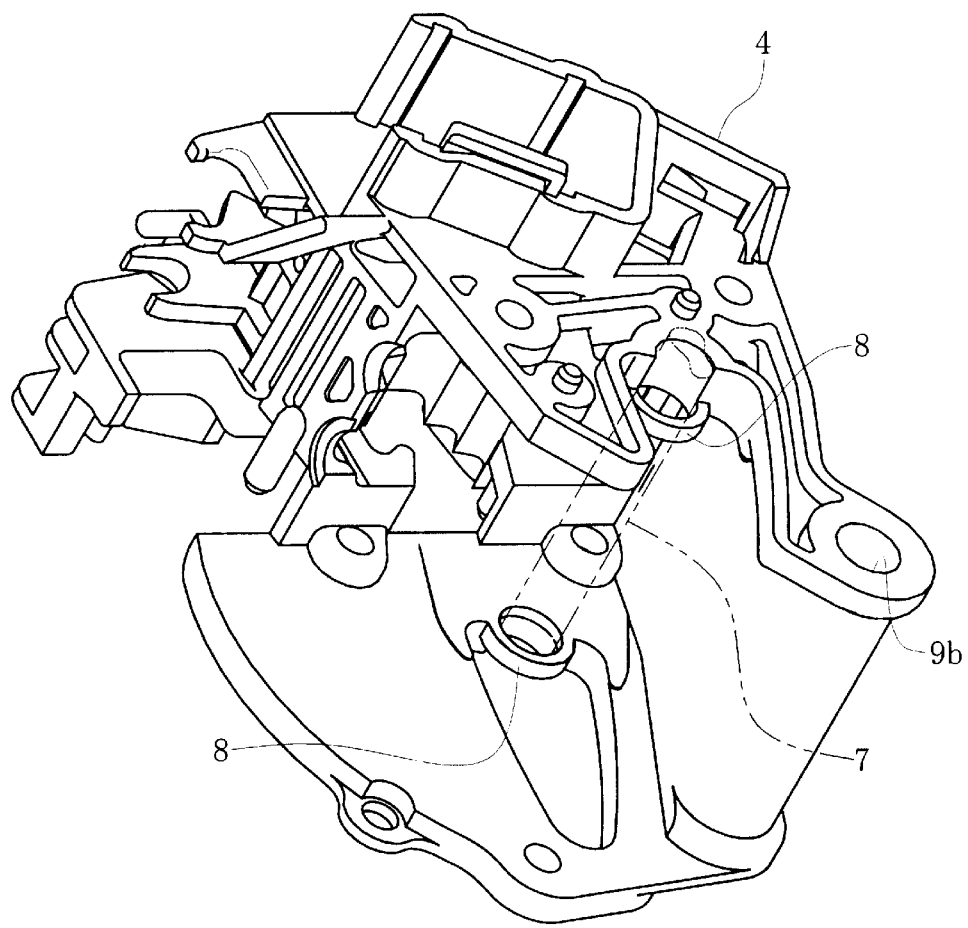
FIG. 3 is a perspective view of a bracket in the transmission control apparatus of FIG. 1.

The bracket 4 forms a main part of the transmission apparatus 1 and supports the control lever unit 3 operated by a driver of a vehicle to change the driving mode of the vehicle. The bracket 4 is formed as aluminum die casting and is integrally formed with supporting portions 8 as shown in FIG. 3. The aluminum die casting makes it possible to form the bracket having excellent resistance against the temperature and a predetermined breakage characteristics of the supporting portions 8.

Each supporting portion 8 is formed as a substantially annular configuration having an inner diameter substantially identical to an outer diameter of the supporting shaft 7 allowing a passage of the shaft 7 through the supporting portion 8. The supporting portion 8 is designed to be broken by the shaft 7 when a shock load exceeding a predetermined level is applied to the control lever unit 3 by adjusting the thickness of the annular portion of the supporting portion 8. The elongation percentage of the material forming the supporting portion is preferably less than 10%.

It may be possible to form the bracket 4 and the supporting portions 8 from separate members and to secure the supporting portions 8 to the bracket 4 via bolts or rivets. In this case the connection between the bracket 4 and the supporting portions 8 should not be broken by a force less than said predetermined level.

Figure 4:
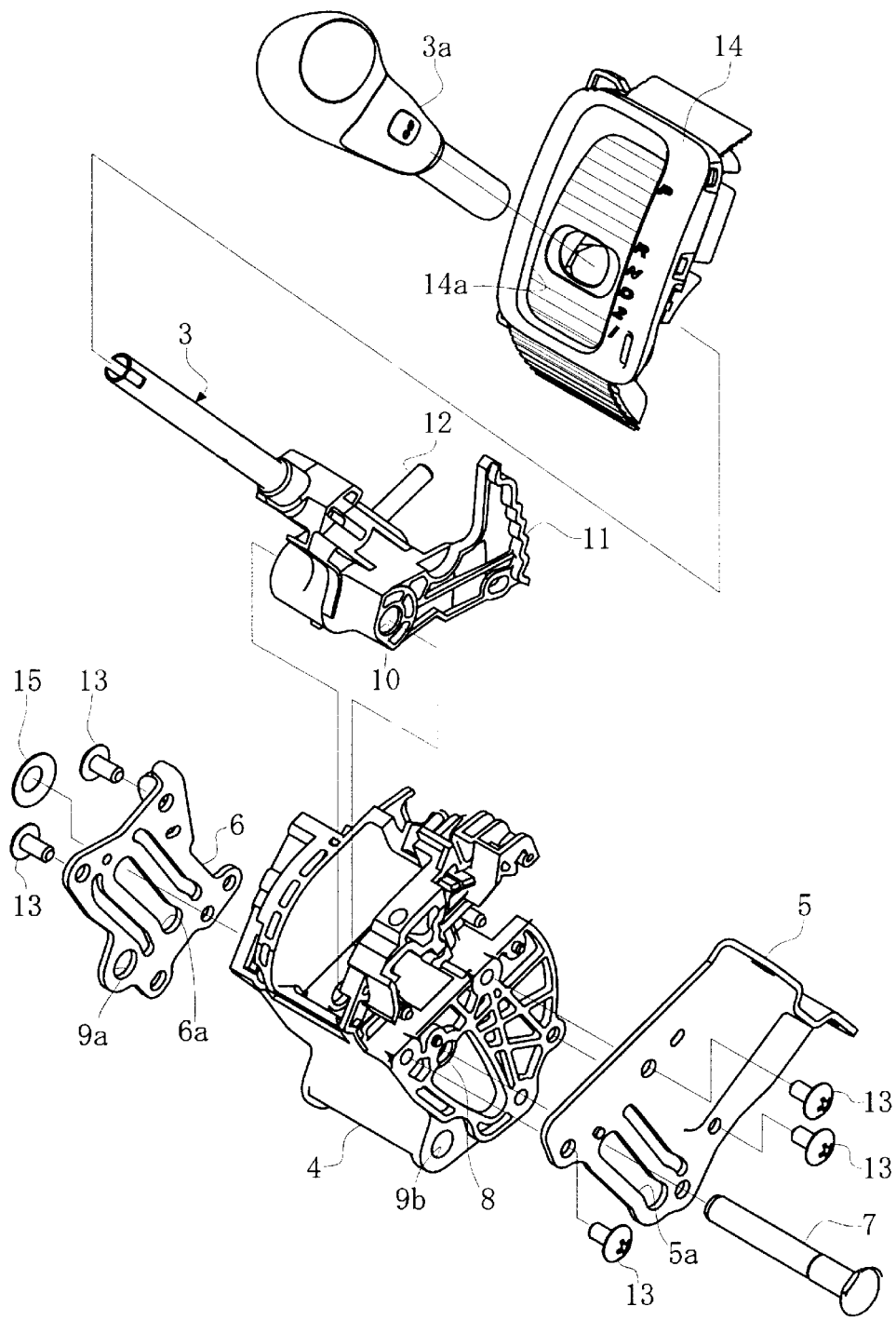
FIG. 4 is an exploded view of the transmission control apparatus of FIG. 1.

As shown in FIG. 4, the control lever unit 3 comprises an aperture 10 into which the supporting shaft 7 inserted, a position holding portion 11 under an action of a leaf spring (not shown) arranged below to hold the control lever unit 3 at the shifted position thereof, and a link mounting portion 12 for mounting a link for transmitting the shifting motion of the control lever unit 3 to the transmission (not shown). It is preferable in view of the strength and the manufacturing cost to form these portions integrally with resin. A gripping knob 3a is mounted on the top end of the control lever unit 3.

Figure 2:
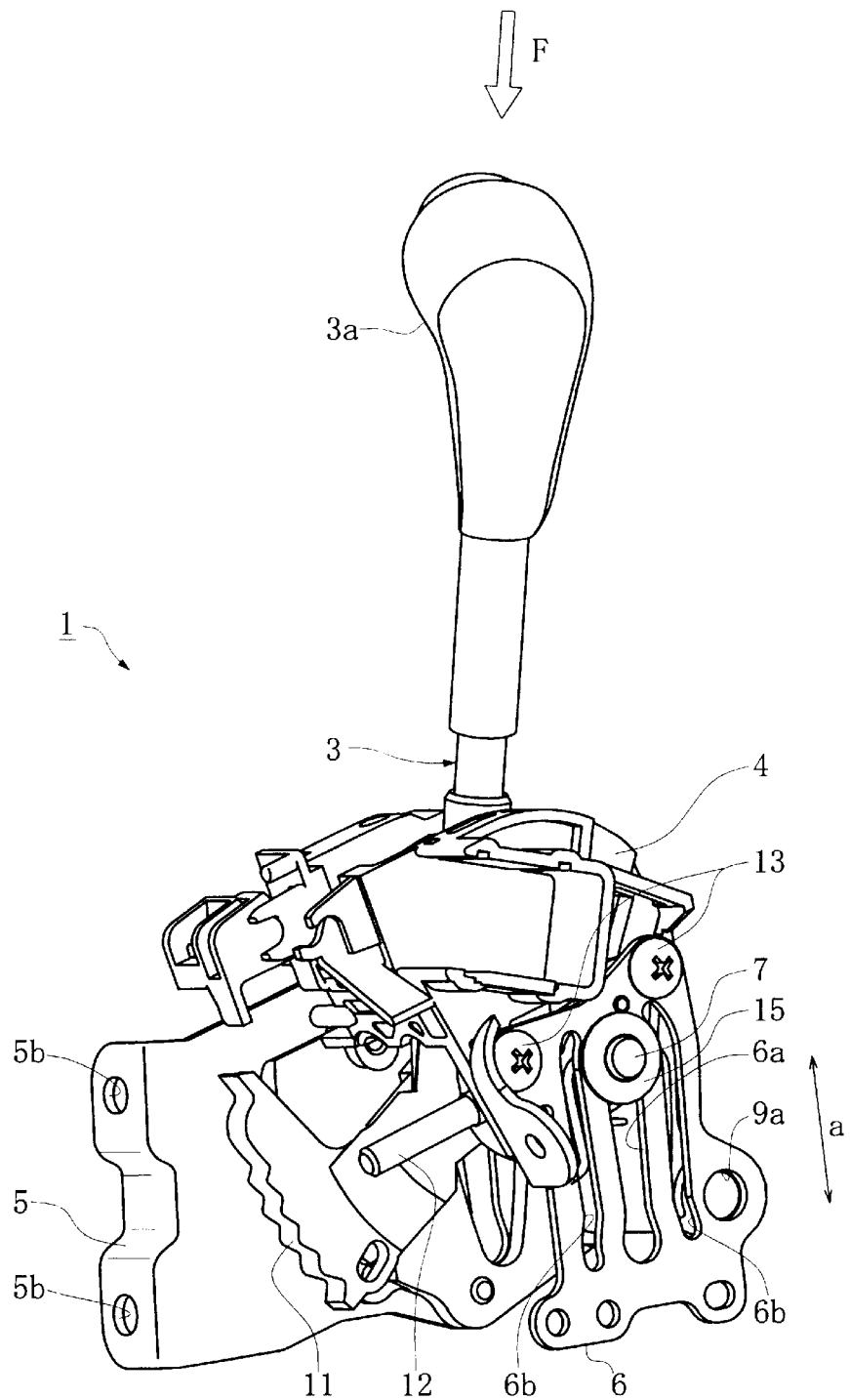
FIG. 2 is a perspective view of the transmission control apparatus of FIG. 1.

Plates 5 and 6 are secured to opposite sides of the bracket 4 via screws 13. The plate 5 having L-shaped configuration is also secured the frame of a vehicle via bolts "b" (FIG. 1) passed through apertures 5b (FIG. 2). The plate 5 has a mounting aperture 9a corresponding to an aperture 9b formed in the bracket 4. The bracket 4 is mounted on the frame of a vehicle via a steering hanger bracket (not shown) passed through the apertures 9a and 9b.

Figure 5:
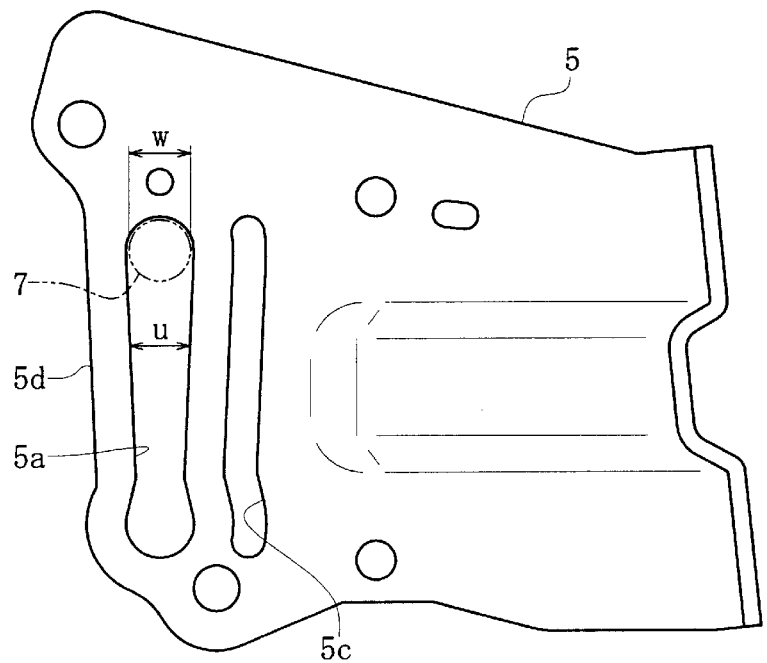
FIG. 5 is a front elevational view of one plate in the transmission control apparatus of FIG. 1.
Figure 6:
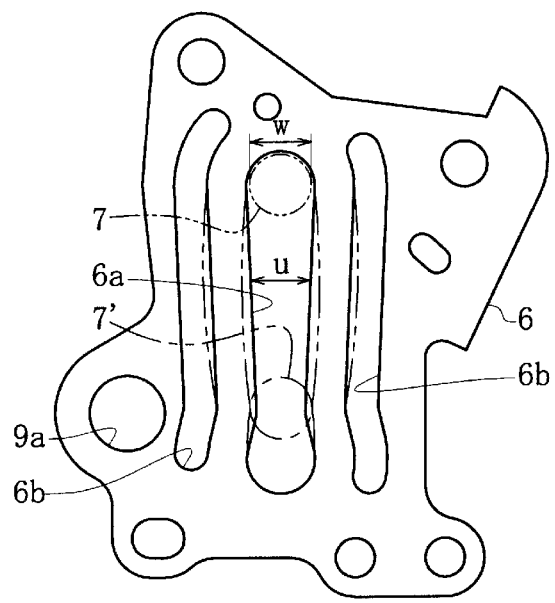
FIG. 6 is a front elevational view of the other plate in the transmission control apparatus of FIG. 1.

The plates 5 and 6 have slots 5a and 6a respectively extending along a direction "a" (FIG. 1) of displacement of the supporting shaft 7 during its shock absorbing stroke. As shown in FIGS. 5 and 6, each slot 5a and 6a has a dimension "w" at its top end substantially identical to the outer diameter of the supporting shaft 7 and a dimension "u" at its elongated portion below the top end smaller than the dimension "w" of the outer diameter of the supporting shaft 7. The slots 5a and 6a deform at their edges to absorb the secondary shock load during the shock absorbing stroke.

Although the width "u" of the slots 5a and 6a may be constant, it is preferable to continuously reduce its width downwardly as shown in FIGS. 5 and 6. Such a design makes it possible to continuously increase the shock load to be absorbed and thus to smoothly absorb the secondary shock load. If the plates 5 and 6 are made of metal having a predetermined ductility, it is possible to attain an ideal absorption of the secondary shock load during the deformation of the slots 5a and 6a. Accordingly, it is preferable to make the plates 5 and 6 of SP metal such as SPCC having the ductility of elongation percentage exceeding 30%.

The plate 5 is formed with a second slot 5c and a notch or recessed portion 5d near the slot 5a and extending substantially parallel therewith in order to let the material loose during the deformation of the slot 5a. Similarly, second slots 6b are arranged at either side of the slot 6a of the plate 6. It is possible to set the value of the shock load to be absorbed by the second shock absorbing portion by previously determining the distance between the slots 5a and 6a and the second slots 5c and 6b or the notch 5.

The components mentioned above are assembled as shown in FIG. 4. Firstly plates 5 and 6 are secured to the bracket 4 via screws 13 and then the supporting shaft 7 is inserted to the slot 5a of the plate 5, the supporting portions 8 of the bracket 4, the aperture 10 of the control lever unit 3, and the slot 6a of the plate 6 and is finally secured at its distal end by a clip 15. Thus the control lever unit 3 is pivotably supported on the bracket 4 via the supporting shaft 7.

The lever portion of the control lever unit is passed through a groove 14a of a decoration panel 14 on which characters (e.g. P, R, N, D, 2, 1 etc.) are inscribed in a conventional manner. The assembly of the main components of the transmission control apparatus for an automobile 1 is accomplished by finally mounting auxiliary parts such as a solenoid valve.

The manner of shock absorption according to the transmission control apparatus 1 of the present invention will be hereinafter described.

When a shock load "F" exceeding a predetermined value is applied to the control lever unit 3, the supporting parts 8 supporting the shaft 7 will be initially broken and thus will absorb the initial shock load. The absorption of the shock load due to the breakage can improve the static strength as compared with the absorption due to the deformation. Said predetermined value of the shock load "F" can be determined by appropriately setting the thickness of the supporting portion 8.

Figure 7:
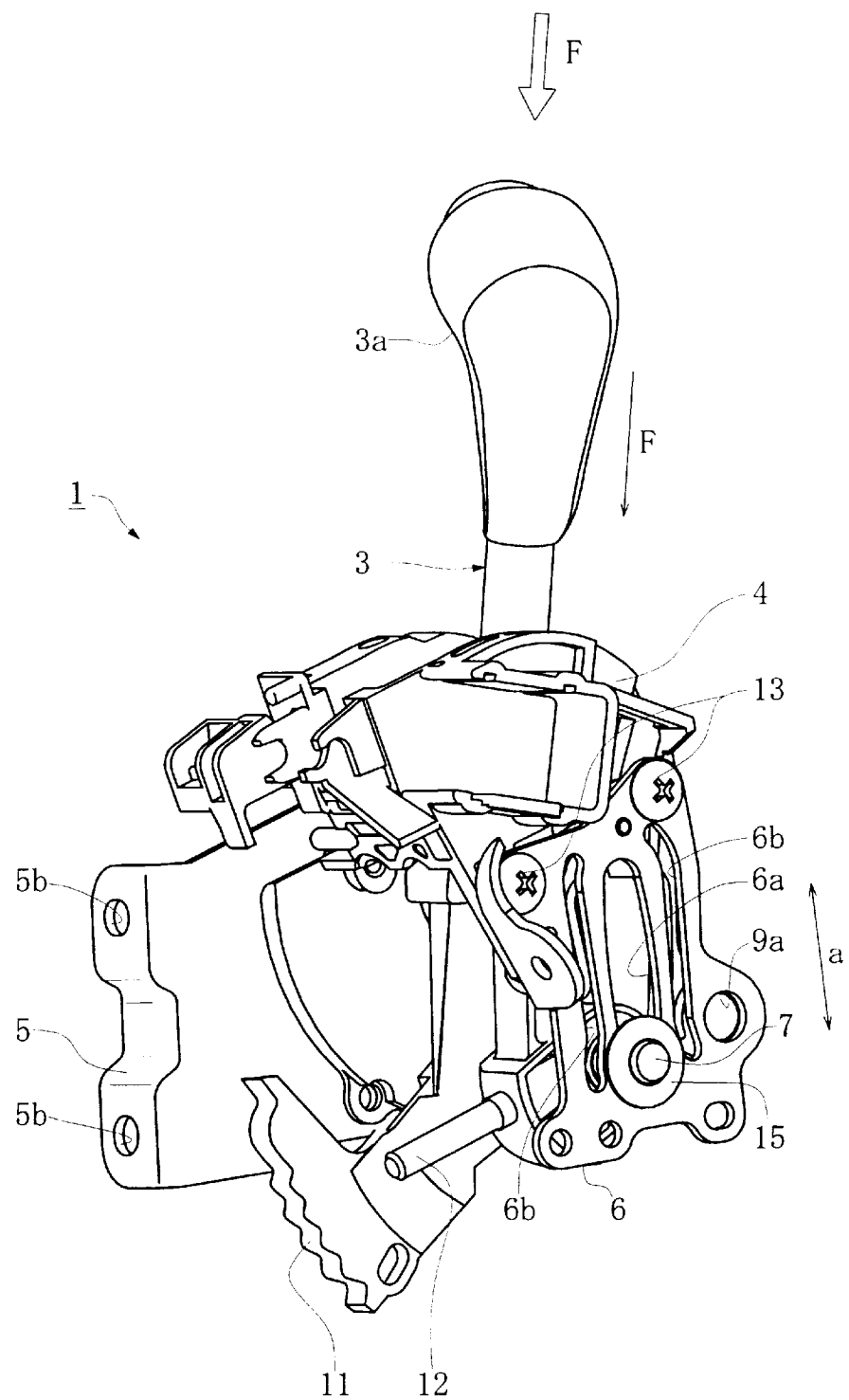
FIG. 7 is a perspective view of the transmission control apparatus of FIG. 1 showing its condition after having absorbed the shock load.

Since the supporting shaft 7 is released from the support by the bracket 4 when the supporting portions 8 is broken, the supporting shaft 7 is displaced together with the control lever unit 3 along slots 5a and 6a (the direction "a" in FIGS. 1, 2 and 7). The condition after the control lever unit 3 having displaced is shown in FIG. 7. During which, the slots 5a and 6a are expanded by the supporting shaft 7 and thus absorb the secondary shock load after the absorption of the initial shock load due to the breakage of the supporting portions 8. The material near the slots 5a and 6a can be displaced toward the second slots 5c and 6b and the notch 5d. The deformed condition of the slot 6a is shown in FIG. 6 by dotted lines. A numeral 7' denotes the position of the supporting shaft 7 after having displaced.

Since the secondary shock load is absorbed by the deformation of the slots 5a and 6a, the secondary shock load can be smoothly absorbed by a simple structure. In addition, since the shock load F can be absorbed only by the control lever unit 3 and the shaft 7 supporting the control lever unit 3, it is possible to substantially reduce the space to be prepared for displacement of the structural components as compared with the case in which whole transmission control apparatus should be displaced in order to absorb the shock load as in the prior art.

It is preferable to set the direction of the slots 5a and 6a i.e. the direction "a" at a direction of the lever of the control lever unit 3 extends while the vehicle is running forward and can be determined in consideration of positions the steering wheel or seats based on the vehicle.

According to the preferred embodiment of the present invention, since the initial shock load is absorbed by the breakage of the structural parts and the second shock load is absorbed by the deformation of the structural parts, it is possible to easily adjust the shock absorbing characteristics. Furthermore, since the secondary shock load can be absorbed continuously over a predetermined stroke, it is possible to smoothly perform the absorption of the secondary shock load.

Although preferred embodiments are illustrated and described above, it should be noted that the present invention is not limited to these embodiments. For example, it will be applied to a transmission control apparatus for a manual transmission arranged at an instrument panel of a vehicle. In addition, it is possible to arrange the first shock absorbing portion at the plates and the second shock absorbing portion at the bracket. This can be achieved by providing the supporting portion for carrying out the shock absorption due to breakage on the plates and also by providing the deformation portion for carrying out the shock absorption due to deformation on the bracket.

Furthermore, the bracket may be molded by any other suitable material (e.g. plastics) than aluminum, in such a case, glass fiber reinforced plastics having the elongation percentage less than 10% will be preferable. In addition, the bracket may be directly secured to the frame of a vehicle, in such a case, the plates are dedicated to the function of second shock absorbing members.

It is also possible to arrange the transmission control apparatus not only at a region of the instrument panel as illustrated in the preferred embodiment, but at a region near the instrument panel.

What is claimed is:

1. A transmission control apparatus for an automobile to be arranged on or near an instrument panel of a vehicle comprising:
   a bracket for supporting a control lever unit for speed-change operation;
   a plate secured to the bracket:
   a shaft passed through both the bracket and the plate for rotatably supporting the control lever unit therearound;
   a first shock absorbing portion adapted to be broken when a shock load exceeding a predetermined value is applied to the control lever unit in order to absorb the shock load and to release the support of the shaft from one of the bracket or the plate; and
   a second shock absorbing portion adapted to be deformed by the shaft released from one of the bracket or the plate and displaced together with the control lever unit over a predetermined stroke in order to continuously absorb the shock load;
   the second shock absorbing portion being made of material different from that of the first shock absorbing portion.

2. A transmission control apparatus for an automobile of claim 1 wherein the first shock absorbing portion comprises a supporting portion forming an aperture through which the shaft is passed;
   the second shock absorbing portion comprises a deformable portion formed by a portion through which the shaft can pass and a slot extending along the displacement direction of the shaft and having a width smaller than the outer diameter of the shaft; and
   the supporting portion is formed in one of the bracket or the plate and the deformable portion is formed in the other of the bracket or the plate.

3. A transmission control apparatus for an automobile of claim 2 wherein the supporting portion is formed in the bracket, and the deformable portion is formed in the plate.

4. A transmission control apparatus for an automobile of claim 2 wherein a second slot or a notch is additionally formed near the slot extending substantially parallel with the slot.

5. A transmission control apparatus for an automobile of claim 3 wherein a second slot or a notch is additionally formed near the slot with extending substantially parallel with the slot.

6. A transmission control apparatus for an automobile claim 1 wherein the bracket is formed by molding, and the first shock absorbing portion is integrally formed with the bracket.

7. A transmission control apparatus for an automobile of claim 2 wherein the bracket is formed by molding, and the first shock absorbing portion is integrally formed with the bracket.

8. A transmission control apparatus for an automobile of claim 3 wherein the bracket is formed by molding, and the first shock absorbing portion is integrally formed with the bracket.

9. A transmission control apparatus for an automobile of claim 4 wherein the bracket is formed by molding, and the first shock absorbing portion is integrally formed with the bracket.

10. A transmission control apparatus for an automobile of claim 1 wherein the plate is made of metal having a predetermined ductility.

11. A transmission control apparatus for an automobile of claim 2 wherein the plate is made of metal having a predetermined ductility.

12. A transmission control apparatus for an automobile of claim 3 wherein the plate is made of metal having a predetermined ductility.

13. A transmission control apparatus for an automobile of claim 4 wherein the plate is made of metal having a predetermined ductility.

14. A transmission control apparatus for an automobile of claim 5 wherein the plate is made of metal having a predetermined ductility.

15. A transmission control apparatus for an automobile to be arranged on or near an instrument panel of a vehicle comprising:

- a bracket for supporting a control lever unit for speed-change operation;
- a plate secured to the bracket;
- a shaft passed through both the bracket and the plate for rotatably supporting the control lever unit therearound;
- a first shock absorbing portion adapted to be broken when a shock load exceeding a predetermined value is applied to the control lever unit in order to absorb the shock load and to release the support of the shaft from one of the bracket and the plate, first shock absorbing portion comprising a supporting portion forming an aperture through which the shaft is passed; and
- a second shock absorbing portion adapted to be deformed by the shaft released from the first shock absorbing portion and displaced together with the control lever unit over a predetermined stroke in order to continuously absorb the shock load, the second shock absorbing portion comprising a deformable portion formed by a portion through which the shaft can pass and a slot extending along the displacement direction of the shaft and having a width smaller than the outer diameter of the shaft;
- wherein the supporting portion is formed in one of the bracket and the plate, and the deformable portion is formed in the other of the bracket and the plate.

16. A transmission control apparatus for an automobile of claim 15 wherein a second slot or a notch is additionally formed near the slot extending substantially parallel to the slot.

17. A transmission control apparatus for an automobile claim 15, wherein the bracket is formed by molding, and the first shock absorbing portion is integrally formed with the bracket.

18. A transmission control apparatus for an automobile of claim 17 wherein the plate is made of metal having a predetermined ductility.

* * * * *

UNITED STATES PATENT AND TRADEMARK OFFICE
CERTIFICATE OF CORRECTION

PATENT NO. : 6,568,295 B2
DATED : May 27, 2003
INVENTOR(S) : Matsuno et al.

It is certified that error appears in the above-identified patent and that said Letters Patent is hereby corrected as shown below:

<u>Title page,</u>
Item [75], Inventors, "Wako" should be -- Wako-shi --.

Signed and Sealed this

Seventh Day of October, 2003

JAMES E. ROGAN
*Director of the United States Patent and Trademark Office*